(12) United States Patent
Loeser

(10) Patent No.: US 7,072,854 B2
(45) Date of Patent: Jul. 4, 2006

(54) PAYMENT SYSTEM BY MEANS OF A MOBILE DEVICE

(75) Inventor: Martin Loeser, Paderborn (DE)

(73) Assignee: Wincor Nixdorf International GmbH, Paderborn (DE)

( * ) Notice: Subject to any disclaimer, the term of this patent is extended or adjusted under 35 U.S.C. 154(b) by 0 days.

(21) Appl. No.: 10/058,551

(22) Filed: Jan. 28, 2002

(65) Prior Publication Data
US 2002/0107745 A1    Aug. 8, 2002

(30) Foreign Application Priority Data
Feb. 6, 2001    (EP) .................................. 01102566

(51) Int. Cl.
*G06Q 1/12*    (2006.01)
(52) U.S. Cl. .......................................... 705/21; 705/16
(58) Field of Classification Search ................... 705/21, 705/16, 17
See application file for complete search history.

(56) References Cited

U.S. PATENT DOCUMENTS 6,179,206 B1 *   1/2001   Matsumori ................... 235/383
6,195,542 B1 *   2/2001   Griffith ......................... 455/406
6,199,753 B1 *   3/2001   Tracy et al. ................. 235/375
6,487,540 B1 * 11/2002   Smith et al. ................... 705/21
6,512,919 B1 *   1/2003   Ogasawara .................. 455/422

FOREIGN PATENT DOCUMENTS

| DE | 199 61 793 C1 | 12/1999 |
| DE | 199 03 822 A1 | 8/2000 |
| EP | 0 708 547 A2 | 4/1996 |
| WO | WO 98/11519 | 3/1998 |
| WO | WO 98/47116 | 10/1998 |
| WO | WO 98/52151 | 11/1998 |

* cited by examiner

*Primary Examiner*—Ronald Laneau
(74) *Attorney, Agent, or Firm*—Michaud-Duffy Group LLP

(57) ABSTRACT

Performance of payment processes, in which
  a cash register transmits a payment demand wirelessly to a mobile device of a customer,
  the latter checks the payment demand,
  if the result is positive, generates from it a payment instruction,
  transmits the latter to a payment center,
  the payment center checks the payment instruction,
  if the result is positive, the payment center sends a payment confirmation to the cash register,
  the cash register checks the payment confirmation,
  if the result is positive, indicates this and releases goods to be paid for.

8 Claims, 1 Drawing Sheet

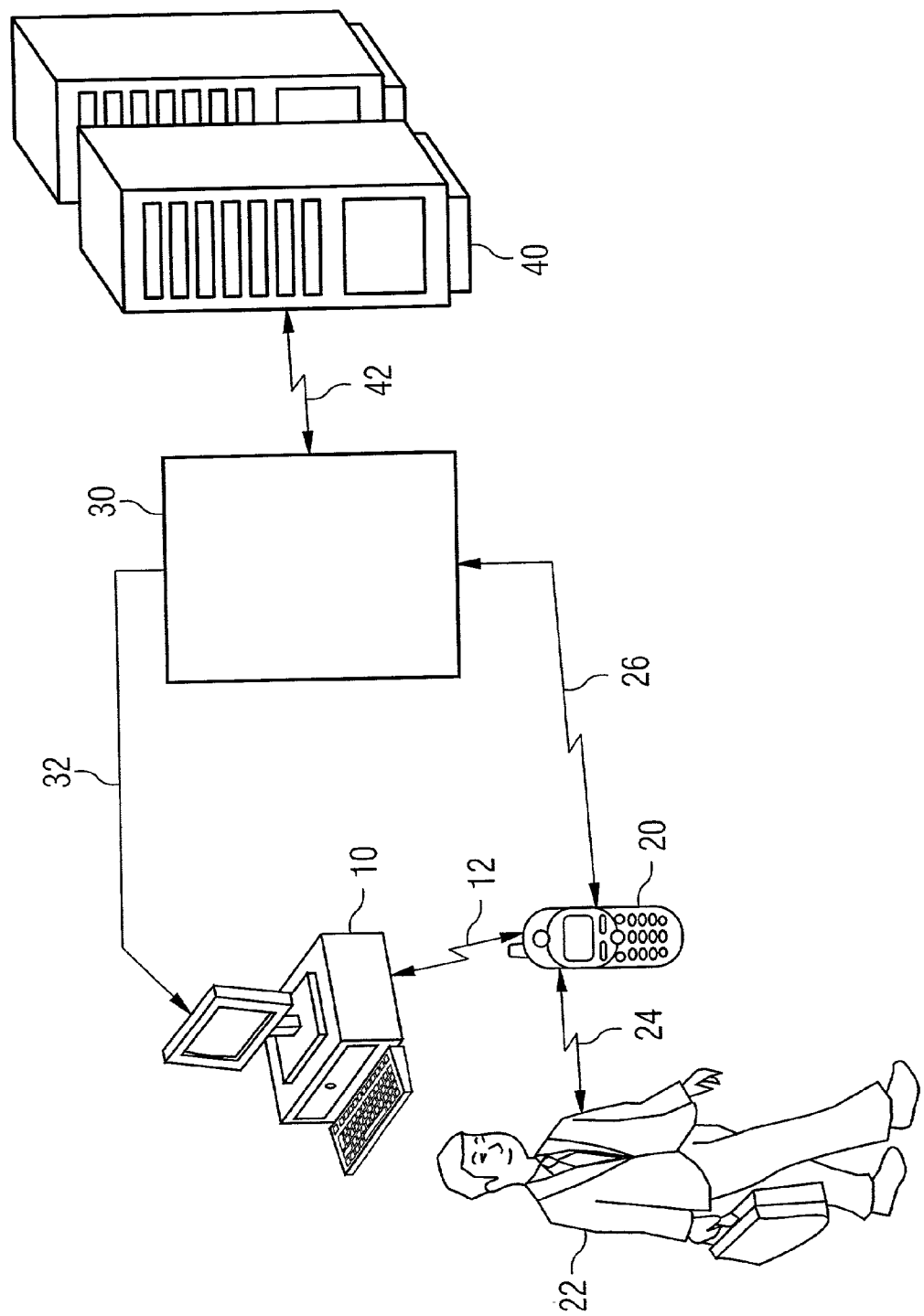

PAYMENT SYSTEM BY MEANS OF A MOBILE DEVICE

CROSS REFERENCE TO RELATED APPLICATIONS

This application is entitled to the benefit of, and incorporates by reference, essential subject matter disclosed in European Patent Application No. 01102566.5 filed on Feb. 6, 2001.

TECHNICAL FIELD

The invention relates to the handling of electronically performed payment processes by using a mobile device which uses a wireless data link.

The use of mobile telephones for the purpose of payment is described in European patent application EP 0 708 547 A2. This makes use of the fact that a secure identification of the subscriber is needed even just for setting up a connection, because of invoicing it. In this proposal, therefore, the amount is input by the subscriber on his mobile telephone, confirmed by the network operator and transmitted to the cash office of the dealer. It is also proposed to use a wireless link between cash office and mobile telephone, in which the cash office monitors or intercepts the communication to the switchboard regardless of the fact that this link is encrypted and should not be interceptable by third parties.

A payment system in which a mobile telephone confirms the payment is described in international publication WO 98/47116. A computer designated as TSN, which splits the handling of the payment traffic, is used for this purpose. The mobile telephone sends a message to the TSN in which the receiving cash office and the amount are designated. The TSN then sends a confirmation to the cash office. Direct communication via a short-distance link is not described.

In international publication WO 98/52151, a payment system is described in which the payment process is effected by a digitally signed payment instruction, an electronic check, as it were.

In international publication WO 98/11519, a system for cashless payment by means of a mobile radio telephone is described. In this system, a link is set up from the mobile radio telephone to a business terminal, e.g. a cash register, and via this link, the solvency of the customer is confirmed to the cash register. After the solvency check, the cash register transmits the amount via the mobile radio link to the mobile telephone where the customer confirms payment. The mobile radio link, therefore, is maintained for the whole period and paid by the customer. In the application, a wireless short-distance link via, e.g. infrared, is provided via which, however, only the telephone number of the cash register is transmitted.

In patent specification DE 199 61 793 C1, the method of the aforementioned document is improved with respect to vending machines to the extent that the customer can select goods via a wireless short-distance link and the selected goods are then paid for in a miliar manner.

In Offenlegungsschrift DE 199 03 822 A1, a payment system is described in which a mobile telephone is used for confirming the payment. The dealer station transmits an inquiry to a balancing facility which, in turn, sends an inquiry to the mobile telephone and sends a confirmation to the dealer station if the response is appropriate. A wireless link between the dealer station and the mobile telephone is only used for optimizing the method, for transmitting data which otherwise would have to be entered manually. In particular, the balancing facility must have a transaction memory in which transactions which have been begun and are not yet concluded are stored while the connection to the mobile telephone is set up, held and cleared down. The response time of the buyer is, therefore, contained in the call time so that systems of increased reliability are needed.

It is the object of the present invention to specify a payment system which is improved with respect to the said proposals.

In particular, a wireless short-range link between a cash register (or, respectively, another dealer terminal which is to book a payment) and a mobile telephone (or another device with a mobile radio or other data network) is used for transmitting the amount to be paid and the address of the cash register to the mobile telephone. This process takes place off-line, i.e. without mobile radio link. The customer confirms the amount whereupon the mobile telephone sets up a connection to a payment center and transmits to it a payment instruction.

In a first variant, the connection can be cleared down again immediately; with a suitable design, in particular, the short messages service (SMS) can be used which transmits the message at a flat rate without time-related call charges. The payment center checks the payment instruction and then sends a payment confirmation to the address of the cash register contained in the payment instruction. The encashment process is concluded with the reception of the payment confirmation. This link, too, does not need to be held for a prolonged period; moreover, the payment center does not need a transaction memory since no bidirectional communication is necessary.

In a second variant, the short-distance link is used for sending the payment confirmation to the cash register which thus does not need its own network link. Instead, either the link from the mobile telephone to the payment center is maintained or set up again by the center. Both capabilities can be changed within a short time depending on network loading, time of day, region etc. This function is preferably transparent in a mobile telephone by using, for example, an IP network in which the mobile telephone takes over the router function. This procedure is particularly suitable with the introduction of GPRS as a mobile radio system in which, instead of a time-related charge, a data volume charge is levied.

Other features and advantages of the invention are obtained from the following description which explains the invention by means of an exemplary embodiment in conjunction with the attached drawings.

BRIEF DESCRIPTION OF THE DRAWINGS

FIG. 1 shows a symbolic representation of the components involved in the invention, and their links.

BRIEF DESCRIPTION OF AN EMBODIMENT OF THE INVENTION

In the text which follows, the invention will be described by means of an exemplary embodiment.

FIG. 1 shows a cash register 10 which in this case stands for any device which triggers a payment process. Close to the cash register there is a customer 22, who has a mobile device 22, particularly a mobile telephone. The customer 22 operates the mobile device 20 via an interface with keys and displays, in this case symbolized as link 24. A wireless first link 12 between cash register 10 and mobile device 20 can be set up via a short-distance network. Furthermore, a second link 26 between a mobile device 20 and a payment center 30 is used which is effected via a wireless second link which represents a long-distance link. In particular, the familiar mobile radio network with the familiar standards such as GSM, GPRS and UTMS can be used for this purpose. In this arrangement, the payment server does not need to be associated with the network provider so that a wireless LAN, e.g. according to the IEEE 802.11 standard, can also be used if it is not a mobile telephone which is used as mobile device, or the mobile telephone additionally has this interface.

Furthermore, a third data link 32 between the payment center 30 and the cash register 10 is used. In particular, this can be a wholly or partially wire-connected fixed network of familiar type, as will be shown in greater detail below, since both the payment center 30 and the cash register 10 are fixed in location.

Furthermore, a fourth link is needed between the payment center 30 and one or more bank servers 40. The customer 22 has a business relationship with the bank operating the bank server used in each case and in most cases can interrogate the state of his account by means of his mobile device 20 and, in particular, determine whether his account has been debited via the fourth link 42 as will be described in greater detail below.

The invention is directed to a payment process which starts after a customer has selected goods and would previously have paid either with cash, a customer card or a credit card. The device used for this purpose by the dealer will be called a cash register in the text which follows. Naturally, this also means vending machines and the like or self-service points.

According to the invention, a wireless data link is set up between a mobile device of a customer and the cash register. For this purpose, a short-distance radio network such as Bluetooth is preferably used; other linking techniques such as IrDA or proprietary links are also possible. Via this link, the cash register sends to the mobile device of the customer a data record representing a payment demand. This payment demand consists at least of the amount and an identification of the cash register. Preferably it also contains a consecutive number, called transaction number in the text which follows, identifying the payment and generated by the cash register. This can also be contained implicitly or explicitly in the identification of the cash register. Other information such as the purpose of payment, a designation of the goods, an account and the legible name of the owner of the cash register are also suitable but not necessary. Cryptographic protection does not appear to be necessary.

After the payment demand has been checked, the relevant parts of the payment demand, possibly determined by the customer by configuration, particularly the amount, are now displayed on a display of the mobile device of the customer and confirmed by the customer. Following this, a second data record, a payment demand, is generated. This comprises at least the amount and the identification of the cash register; as a rule, also the transaction number and the other fields. For forming the payment instruction, the payment demand is preferably signed digitally. As a rule, an identification or account number of the customer is stored in the mobile telephone and is added to the payment demand when it is formed; it is of no significance whether it is comprised of the signature. The payment demand thus generated is then sent to a payment center via the mobile radio network if a mobile telephone is concerned. In the simplest case, it is done to an address which has been permanently entered in advance. Transmission can take place, for example, by means of an SMS message. As an alternative, a data link can be set up to the payment center, for example via the Internet protocols 'udp/ip', 'tcp/ip', 'http' or 'https' and the message can then be transmitted. Other data links are easily possible and an Internet access can also be provided via 'PPP'. In GSM networks, a modem link will be used, instead; in GPRS and UTMS networks, packet-oriented protocols are already directly available.

When the payment demand arrives at the payment center, it is checked and, in particular, the digital signature is checked. When 'public key' methods are used, the secret key identifying the customer is stored in the mobile telephone and the public key of the payment center, naturally, also exists in the latter. If the payment demand is authentic, a payment confirmation is generated, possibly after consulting tables of blocked accounts and the like. This confirmation again contains the amount and in most cases also the transaction number in order to facilitate allocation for the cash register. It is only of importance that the amount is authenticated by a digital signature and protected against forgery, the secret key of the payment center being used for the signature in this case. Other fields from the payment demand which are not specific to the customer will be added, as a rule. In particular, the account number to which the amount is to be credited will preferably also be included and signed. This account number is preferably already contained in the payment demand and is transmitted with the payment instruction and then included in the payment confirmation and signed. In this case, previous registration of the cash register or of the account of the owner of the cash register is not necessary. It is only necessary that the cash register has the public key stored in an unforgeable manner because the digital signature of the payment confirmation contains the assurance of the payment center that the latter guarantees the payment.

There is a number of possibilities for transmitting the payment confirmation.

One of the two preferred possibilities consists in that the cash register can be reached via a network, particularly the Internet and in this case, in particular, the 'UDP/IP' or 'TCP/IP' protocol. In this case, the payment center receives an IP address with a port number to which the link is to be set up. The use of a 'universal resource locator' (URL), also known as Internet address, is similarly possible. Such a URL for a payment confirmation could be:

"https://cr7.pdb.pay.fuelworld.com/20000112/132305?xyz"

In this case, cash register 7 itself would be an HTTP or HTTPS server and data are transmitted as CGI syntax by adding '?xyz'. Since the HTTP or HTTPS protocol uses TCP/IP for the link, the payment center can be assured that the message has arrived at the cash register. As an alternative, the cash registers of a business can be associated with a server which then signals the completed payment to the cash register via a fixed link. As a rule, it will be provided for further security that the cash register confirms the receipt by a signed response.

Another suitable possibility consists in that the mobile device does not use a datagram such as UDP/IP or in accordance with SMS, but sets up a data link to the payment center and maintains it after sending the payment demand. The short-distance radio network link is also maintained. Using these two, the mobile device provides a return channel to the cash register. A preferred variant consists in that the mobile device acts as IP router and thus temporarily provides an IP link from the payment center to the cash register via the radio link. This makes it possible to use the method described in the previous paragraph without the cash register having to have continuous access to an IP network. Naturally, the use of dynamic IP address and possibly IP masquerading is available to the expert; especially since IP version 6 is not yet available. It is pointed out that this solution only represents one alternative instance of a data link between payment server and cash register; it can also be operated in parallel with a fixed link and it can be left to the routing protocols of the data communication system as to which path is chosen for data transmission.

As already mentioned above, this variant is particularly attractive in the case of packet-oriented protocols charged by data volume such as GPRS or UTMS.

As an alternative to the direct transmission of the payment confirmation to the cash register, it can also be sent from the payment center to the mobile device, particularly again via SMS if this service is fast enough. The mobile device forwards the payment confirmation to the cash register. Since, as a rule, the payment confirmation is digitally signed and the goods are only released when the payment confirmation arrives from the cash register, there is no negative influence on the mobile device. Using IP and using the mobile device as router, however, has the advantage that the method is virtually independent of whether the cash register itself is connected to the Internet or this access is reached via the mobile device.

To credit the amounts in favor of the owner of the cash register, the payment center can do this either per item or as collective credit. However, it is also possible that the payment confirmations are collected in the cash register and then collected ones are sent to the payment center or another agreed place which checks the payment confirmations, accumulates the amounts and effects a collective credit.

The previous description has been based on the fact that arbitrary networks are used and the messages are, therefore, signed digitally. When using closed user groups in X.25 or ISDN, in particular, a signature of the payment confirmation is not necessary, for example, since the cash register can be assured in this case that no third parties have access to the network. In the same manner, the additional digital signature can be omitted when the payment center is integrated into the facilities of the network operator since the communication is encrypted, in any case, and the operator is assured, in any case, via authentication facilities that a particular customer has set up the connection. However, since contemporary cash registers are controlled by modified personal computers, the computing power of which is sufficient for window operating systems and which can handle the necessary cryptographic calculations in fractions of seconds, the digital signature as described is preferred.

Methods for digital signature are generally known from textbooks on cryptography; at present, asymmetric methods, also called public key methods, are preferably used. Further notes can also be found in the above-mentioned publication WO 98/52151.

In particular, the payment confirmation can additionally contain its own public key which is signed by a third entity such as a dealer's association. This process is only necessary between payment center and dealer's association and not bilaterally between each payment center and each cash register.

The same applies to the communication between the mobile device and the payment center. In particular, the operator of the mobile radio network can provide his customers with their public keys signed by themselves in this case. The payment center then only needs to know the public keys of all network operators and not the keys of all users of a mobile device.

It is found that when the method according to the invention is used, virtually no mutual adjustments between cash register and payment center or, respectively, mobile device and payment center are necessary, particularly when cryptographic signatures are used.

The invention claimed is:

1. A method for carrying out payment processes, in which:
   a cash register transmits a payment demand wirelessly via a first link to a mobile device of a customer,
   the mobile device checks the payment demand,
   if the mobile device checking result is positive, the mobile device generates a payment instruction from the payment demand,
   if the mobile device checking result is negative, no payment instruction is generated,
   the mobile device transmits the payment instruction via a second link to a payment center,
   the payment center checks the payment instruction,
   if the payment center checking result is positive, the payment center sends a confirmation directly to the cash register via a third link,
   if the payment center checking result is negative, no payment confirmation is sent,
   the cash register checks the payment confirmation
   if the cash register checking result is positive, indicate said cash register checking result and release goods to be paid for,
   if the cash register checking result is negative, the goods are not released.

2. The method as claimed in claim 1, wherein the payment center, after a positive check of the payment instruction, sends a payment debit to a banking center.

3. The method as claimed in claim 1, wherein the cash register stores the payment confirmations, accumulates the payment confirmations and sends the payment confirmations collected to a payment clearing office, wherein the payment clearing office checks the payment confirmations, accumulates the payment confirmations by amount and credits the owner of the cash register with the total amount.

4. The method as claimed in claim 1, wherein the payment instruction is digitally signed in the mobile device.

5. The method as claimed in claim 1, wherein the payment confirmation is digitally signed in the payment center.

6. The method as claimed in claim 1, wherein the payment demand contains the address to which the payment confirmation is sent.

7. The method as claimed in claim 1, wherein Bluetooth or IrDa is used as a first interface and GSM, GPRS or UTMS are used as a second interference.

8. A cash register for cashless payment, having the following features:
   a first interface for wireless data transmission and a transmitting agent which is connected thereto and which generates a payment demand and sends the payment demand via the first interface,
   a second interface for data transmission and a receiving agent connected thereto which receives a payment confirmation which has arrived via the second interface, a checking facility directly connected to the transmitting agent, the receiving agent and a releasing agent wherein the checking facility receives the payment demand and the payment confirmation, checks the authenticity of the payment confirmation and also checks whether the payment confirmation matches the payment demand, and wherein the checking facility forwards the result of the checking to the releasing agent which outputs a message to an operating person via an output device or releases a goods output.

* * * * *